United States Patent [19]
Brown

[11] Patent Number: 5,553,531
[45] Date of Patent: Sep. 10, 1996

[54] COOKING DEVICE

[75] Inventor: Charles A. Brown, Dallas, Pa.

[73] Assignee: Legion Industries, Inc., Dallas, Pa.

[21] Appl. No.: 361,070

[22] Filed: Dec. 21, 1994

[51] Int. Cl.$^6$ .................................................. A47J 37/10
[52] U.S. Cl. ............................ 99/340; 99/393; 99/407; 99/409; 99/423
[58] Field of Search .......................... 99/339, 340, 393, 99/397, 409, 415, 410, 417, 418, 407, 424, 423; 219/433, 436, 438, 430, 431, 439, 440, 447, 463, 467

[56] References Cited

U.S. PATENT DOCUMENTS

| | | | |
|---|---|---|---|
| 1,983,118 | 12/1934 | Bourque | 219/431 |
| 2,009,791 | 7/1935 | Shroyer | 99/377 |
| 3,432,642 | 3/1969 | Löhr et al. | 219/439 |
| 3,592,668 | 7/1971 | Denk | 99/417 |
| 3,895,216 | 7/1975 | Hurko | 219/463 |
| 3,964,378 | 6/1976 | Dunkelman | 99/446 |
| 4,138,606 | 2/1979 | Brown | 219/438 |
| 4,150,280 | 4/1979 | Hurko | 219/463 |

*Primary Examiner*—David Scherbel
*Assistant Examiner*—Reginald L. Alexander
*Attorney, Agent, or Firm*—Caesar, Rivise, Bernstein, Cohen & Pokotilow, Ltd.

[57] ABSTRACT

A multi-functional cooking device that combines a steamer, skillet, griddle, fryer, kettle and oven into a single unit. The cooking device has a hollow base and a hollow lid. The base and the lid mate to provide an enclosed space for heating food. Heating means are associated with the base, to heat the interior space. Means are provided for lifting the lid relative to the base, and for maintaining the lid at a set position relative to the base. The base is adapted to receive water, so that when it is heated, steam will be formed in the space enclosed by the lid and base. The lower edge of the lid is recessed, and receives in the recess the upper edge of the base, whereby the mating of the two edges provides a junction to maintain steam within the space formed by the lid and base. A mechanism is provided for tilting the base at a predetermined angle, to facilitate the use of the base for grilling or frying foods.

25 Claims, 8 Drawing Sheets

COOKING DEVICE

BACKGROUND OF THE INVENTION

This invention relates to a cooking device, in general, and, more particularly, to a multi-functional cooking device that is particularly adapted to the food service industry.

The food service industry involves the preparation of substantial quantities of food for consumption by a large number of people. Thus, institutions involved in the food service industry include cafeterias, hospitals, colleges, prisons, restaurants, airlines, etc.

Various food preparation devices are in use in the food service industry. These devices include griddles, ovens, deep-fat fryers, kettles, holding cabinets and steamers. Each of the foregoing devices is a self-contained unit, serving only a single function. Each of the units is costly and, more importantly, requires a substantial amount of floor space in the food preparation area.

The device of this invention combines a steamer, skillet, griddle, fryer, kettle, holding cabinet and oven into a single unit. The result is a substantial saving in cost and floor space. Additionally, the device includes a number of features not found in any of the individual cooking devices presently in use.

There are presently available combination steamers and ovens for preparing food. The steam for the devices is prepared by a boiler, and piped into the oven. Each of the devices includes a front door, which is hingedly mounted on the front of the steamer-oven. Whenever it is desired to remove food from the steamer, the front door is opened. This results in a blast of steam hitting the person preparing the food. In addition to being dangerous, this also results in a waste of energy. The opening of the door permits all of the steam to escape from the oven, and the interior of the oven is rapidly cooled. Also, the inside surface of the door is exposed to the food preparer. This is dangerous, since that surface can be at a temperature of up to 500° F.

When a new portion of food is placed in the oven, new steam or hot air must be added in order to bring the temperature of the oven back to its desired point. All of the steam previously in the oven will be lost. Subsequent opening of the front door to remove the prepared food will again result in a loss of all of the steam within the oven, and the rapid lowering of the oven temperature.

In one of the functions of the cooking device of this invention, steam is used to prepare and heat food placed in the device. However, the device of this invention does not include a front door. Instead, the device has a hollow lid, which is raised vertically to permit access into the interior of the device. When the lid is raised, there is no expulsion of steam from the device. Instead, the hot steam rises within the lid, and is maintained within the lid when the food is removed from the device or placed in the device. The lid is then seated on the base of the oven. There is little temperature loss when the lid is raised, and there is no blast of steam caused by the raising of the lid.

When the device is used as a steamer, steam is created at atmospheric pressure. No gasket is provided between the base and the lid or cover of the device. Instead, in order to prevent leakage of steam, the lower edge of the cover is provided with a notch and the upper edge of the base is provided with an angled lip which is received in the notch. Steam that condenses within the lid drips down to the base. However, there is no leakage of steam out of the device, when the lid is in place on the base.

The floor of the base serves the function of being a grill or braising surface. When the lid is lifted out of the way, the cook can easily grill or braise food in the base. One of the features of the invention is that a cam lever is provided for tilting the base to a 10° angle, with the rear of the base being uppermost. When at this angle, any fat or grease can easily be drained from the grilling surface. The 10° angle is also satisfactory for permitting the frying or grilling of food, and letting the fat automatically drain, while the food remains on the griddle plate. Utilizing the 10° angle, or a slightly larger preset angle, the food will not slide while it is being fried, but the fat will drain.

In another aspect of this invention, a novel mechanism is provided for heating the griddle plate. Electrical heating bars, placed against the bottom surface of the griddle plate, are held in place under a spring pressure. They are not directly secured to the bottom of the plate, and are capable of sliding relative to the bottom of the plate. By having this securement mechanism, where there are differential coefficients of expansion between the heating bars and the plate, the heating bars will still make good contact with the plate. In the prior art, where heating bars were secured to the plate, there could be a gapping between the bottom of the plate and the heating bars, caused by different coefficients of thermal expansion.

OBJECTS OF THE INVENTION

Accordingly, it is an object of this invention to provide a novel cooking device.

It is another object of this invention to provide a griddle that can be inclined to a preset angle, to provide drainage of any fat or other refuse on the griddle.

It is a further object of this invention to provide a novel electrical heating mechanism for a griddle.

It is yet a further object of this invention to provide a novel device for the steaming of food products.

It is yet a further object of this invention to provide a food steaming device having a novel seal between the base and the lid of the device.

SUMMARY OF THE INVENTION

These and other objects of the invention are accomplished by providing a cooking device having a hollow base and a hollow lid. The base and the lid mate to provide an enclosed area for heating food. Heating means are associated with the base, to heat the interior area. Means are provided for lifting the lid relative to the base, and maintaining the lid at a set position relative to the base. The base is adapted to receive water, so that when it is heated, steam will be formed in the area enclosed by the lid and base. The lower edge of the lid is recessed, and receives in the recess the upper edge of the base, whereby the mating of the two edges provides a junction to maintain steam within the area formed by the lid and base.

DESCRIPTION OF THE DRAWINGS

Other objects and many of the attendant advantages of this invention will become readily appreciated as the same becomes better understood by reference to the following detailed description, when considered in connection with the accompanying drawings, wherein.

DETAILED DESCRIPTION OF THE PREFERRED EMBODIMENT

Figure 1:
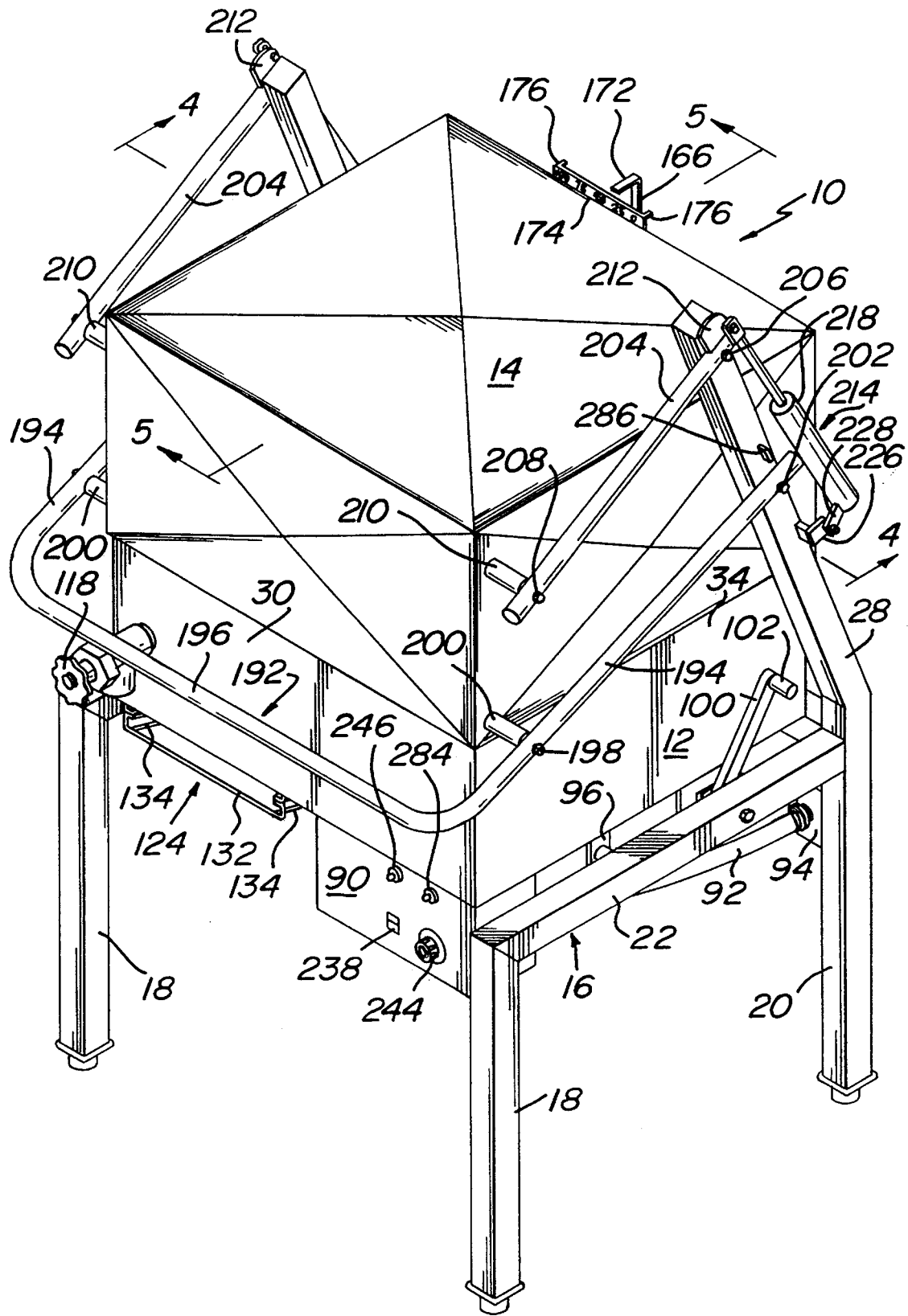
FIG. 1 is a perspective view of the cooking device of this invention, shown in its closed position.

Referring now in greater detail to the various figures of the drawing, wherein like reference characters refer to like parts, a cooking device embodying the present invention is generally shown at 10 in FIG. 1. Device 10 comprises a base 12 and a lid 14.

Figure 4:
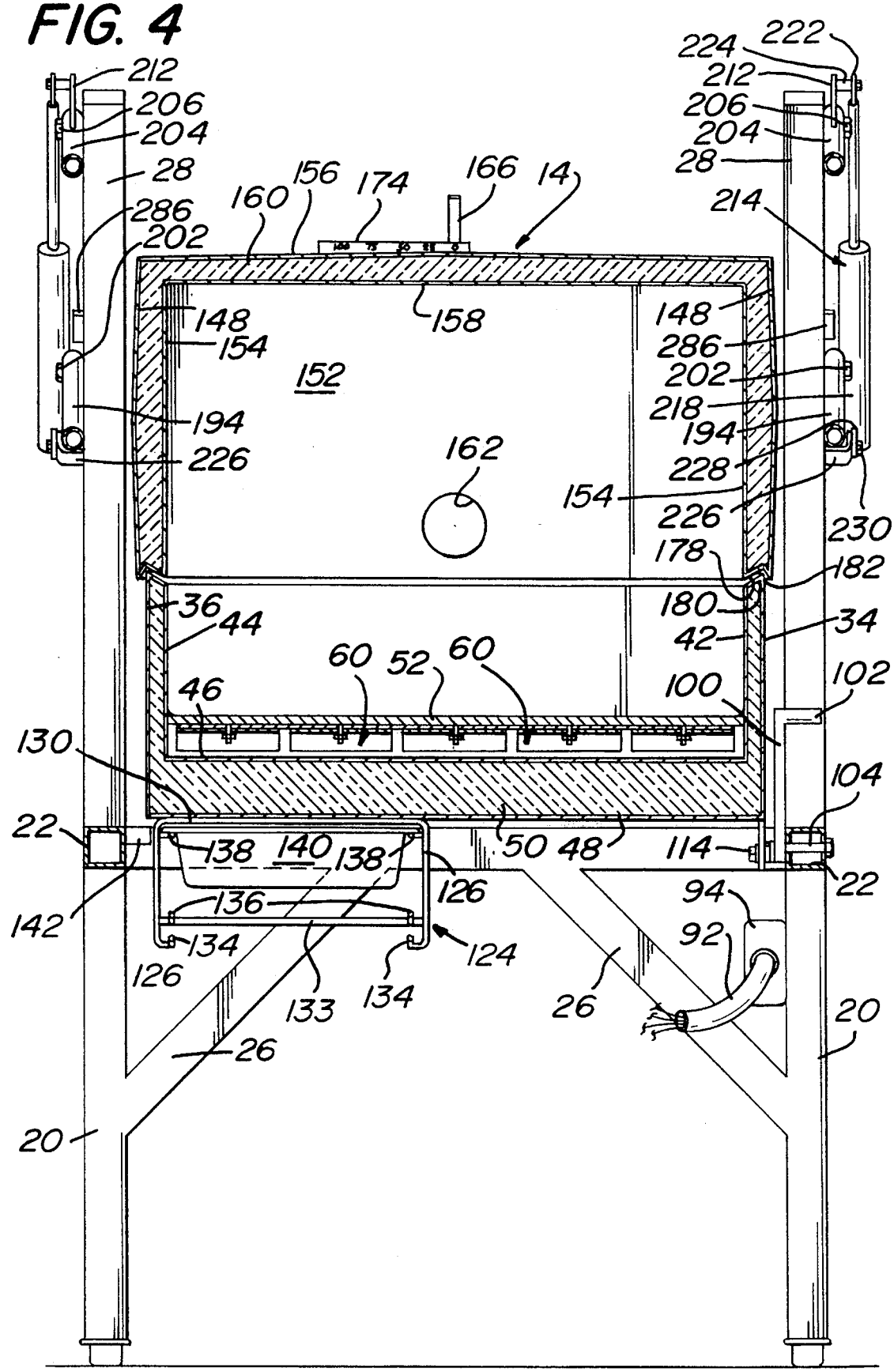
FIG. 4 is a sectional view taken along the line 4—4 of FIG. 1.

Base 12 is supported on frame 16. Frame 16 includes a pair of front legs 18, a pair of rear legs 20, side supports 22 connecting the front and rear legs and a rear support 24 (FIG. 4) connecting the rear legs. As seen in FIG. 4 braces 26 connect rear legs 20 and rear support 24. The legs, supports and braces of frame 16 are hollow, square in cross-section and welded together. Rear legs 20 include upwardly extending and inclined arms 28, which are unitary with the rear legs.

Figure 5:
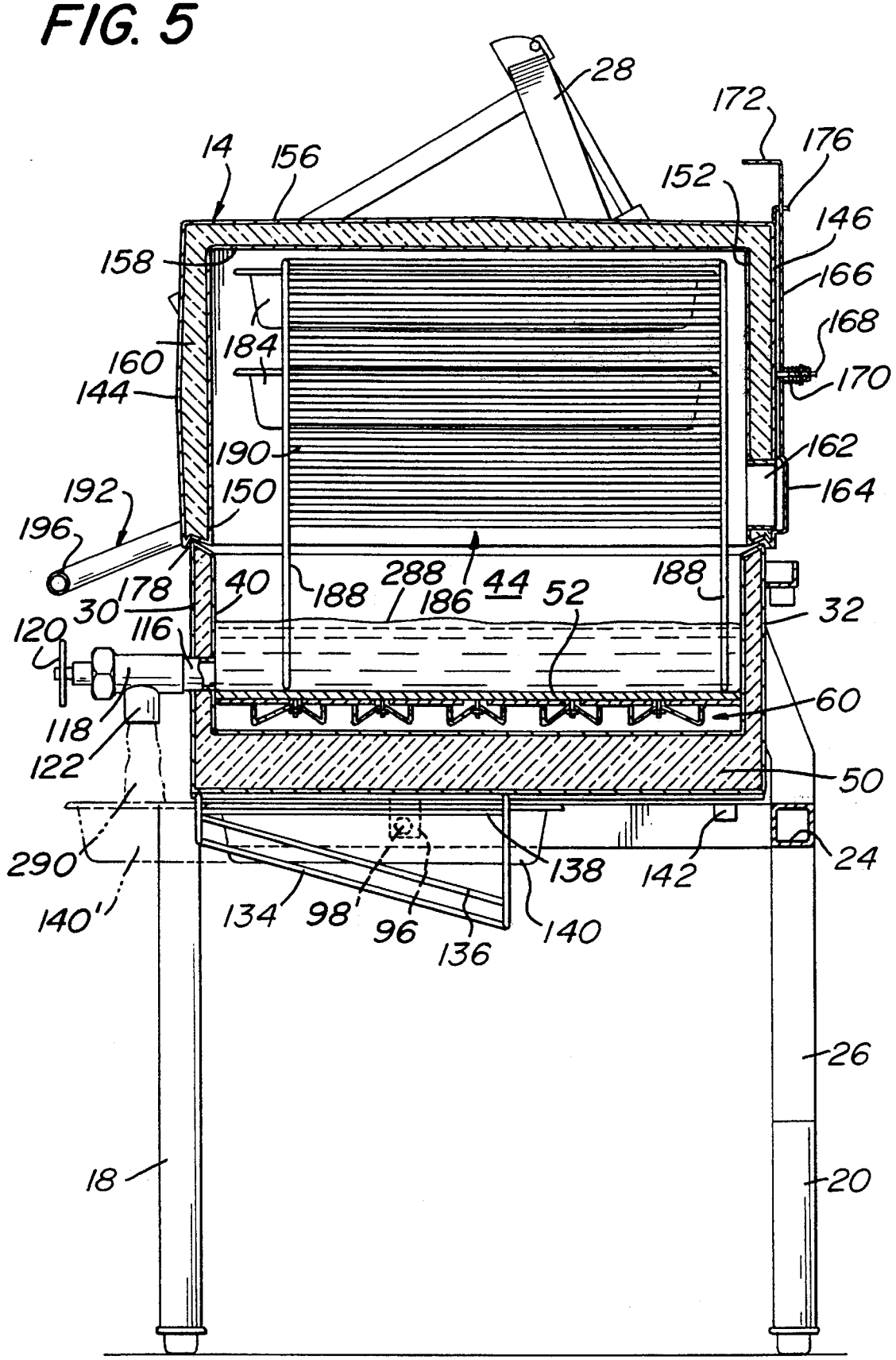
FIG. 5 is a sectional view taken along the line 5—5 of FIG. 1.
Figure 6:
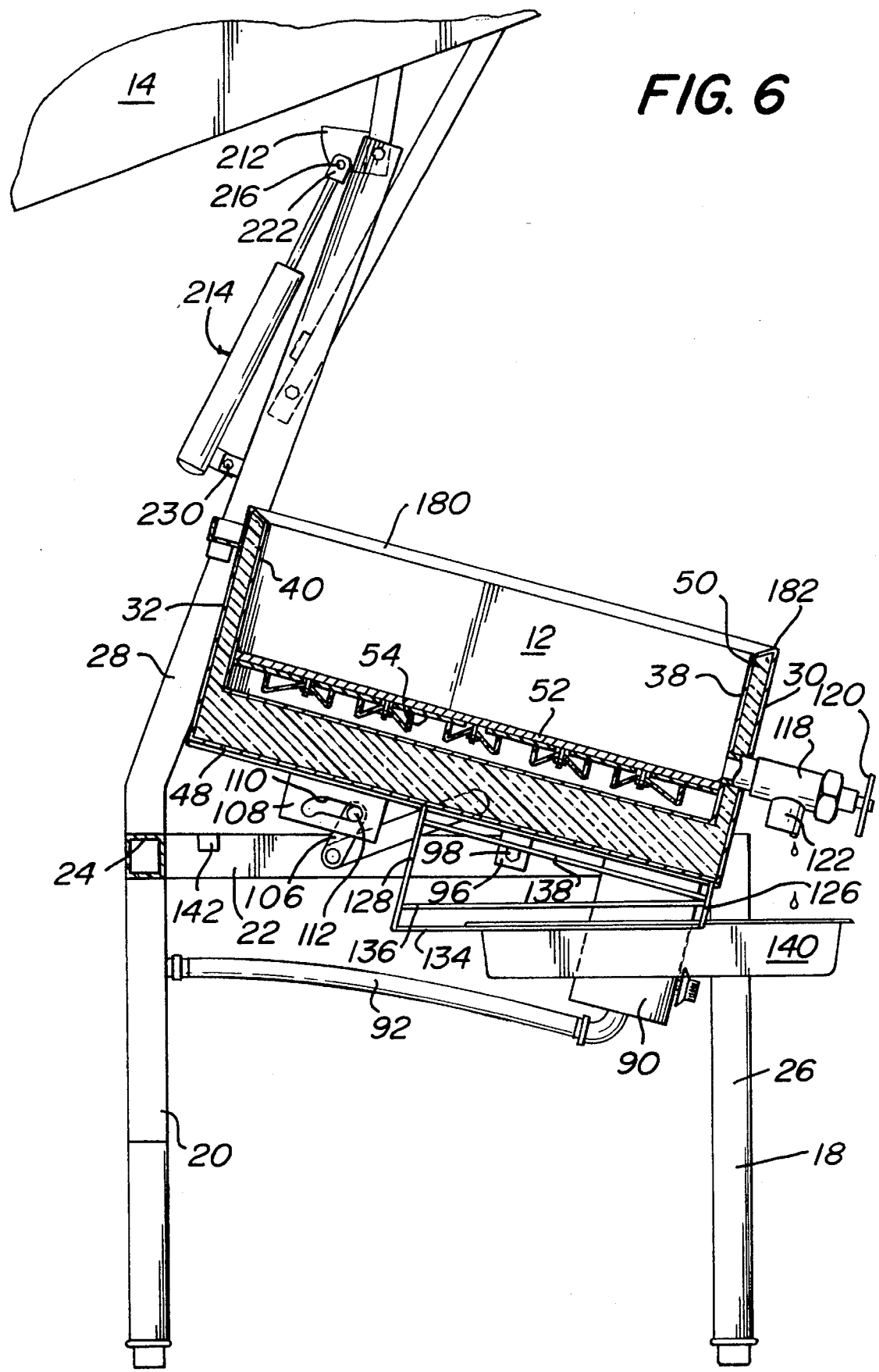
FIG. 6 is a side sectional view of the device of this invention, with the device being in its fully open position.

As seen in FIGS. 4, 5 and 6, base 12 is hollow, and is open at its top. It includes an outer front wall 30, an outer rear wall 32 and outer side walls 34 and 36. The base further includes an inner front wall 38, an inner rear wall 40 and inner side walls 42 and 44. Base 12 further includes an inner bottom 46 and an outer bottom 48. The inner and outer walls and inner and outer bottoms are spaced, and the spaces separating them are filled with insulation 50. The insulation can be any insulation normally used in cooking devices, such as fibreglass, cellulose, etc.

Spaced above, and parallel to, inner bottom 46 is a griddle plate 52. Griddle plate 52 is welded to inner walls 38, 40, 42 and 44. The welds form a liquid-tight seal between the griddle plate and the walls.

Figure 7:
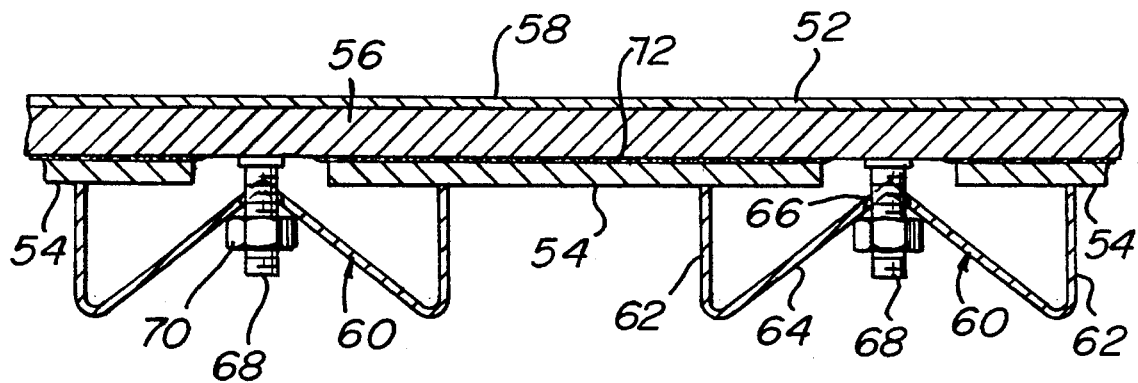
FIG. 7 is a side sectional view of the heater bars for the griddle plate of this invention.

As best seen in FIG. 7, mounted against the underside of griddle plate 52 are a plurality of heater bars 54. The griddle plate 52 can be formed totally of stainless steel, or, as shown in FIG. 7, it can be formed from another metal 56 that is clad with a stainless steel layer 58. The base metal 56 can be any heat conductive metal, such as aluminum, copper or steel. The heater bars can be any conventional electrically heatable bars used in heating thermally-conductive surfaces. In a preferred embodiment, the heater bars are formed from nichrome wire sandwiched in sheets of mica. The heat is generated by the nichrome wires, and the mica provides electrical insulation.

The heater bars 54 are held against the underside of griddle plate 54 by leaf springs 60. Each leaf spring 60 includes a pair of vertical legs 62 which are unitary with a central portion 64. The central portion has the shape of an inverted V. An opening 66 is formed at the apex of the central portion 64.

Bolts 68 are welded to the underside of griddle plate 52. The bolts pass through the central opening 66 in leaf spring 60. A nut 70 is threadedly secured on each bolt 68, and the upper edge of the nut bears against the central portion 64 of the associated leaf spring.

In assembling the base 70, the heater bars 54 are placed against the underside of the griddle plate 52. Prior to putting the heater bars in place, their upper surfaces are coated with a high-temperature grease 72. Greases of this type are well known, and are commonly used in high-temperature operations. After the heater bars are in place, the leaf springs are placed over bolt 68, and are held in place by tightening nuts 70. The upper edges of the legs 62 of the leaf springs bear against the undersides of the heater bars 54. The tightening of the nuts provides sufficient pressure to maintain the heater bars in place.

Figure 8:
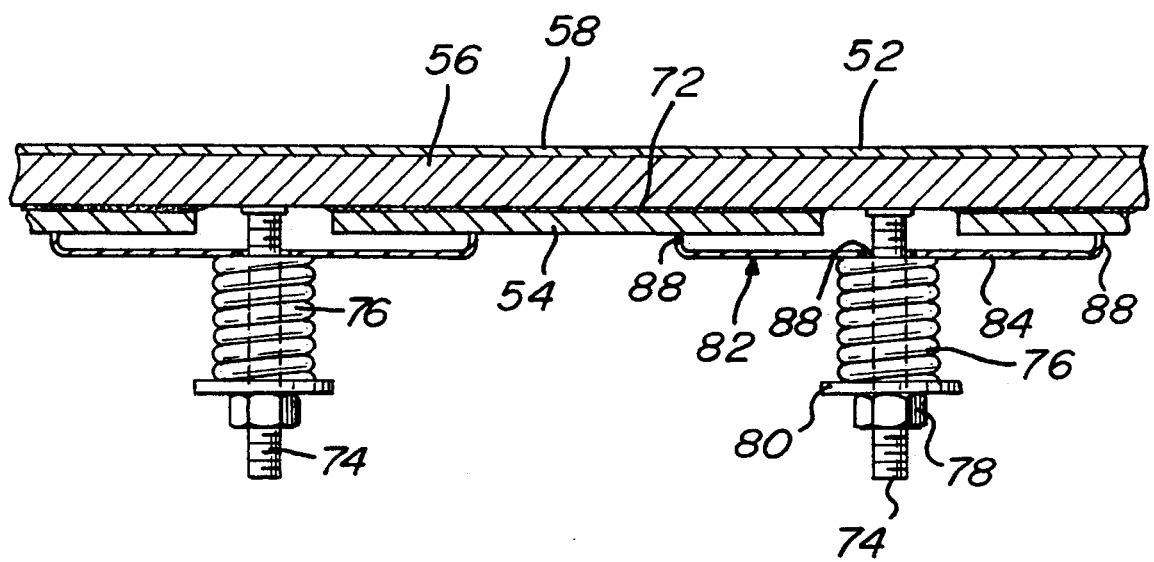
FIG. 8 is a side sectional view of a modified embodiment of the heater bars for the griddle plate of this invention; and, FIG. 9 is a wiring diagram for the device of this invention.

An alternate embodiment of the means for holding the heater bars 54 in place against the griddle plate 52 is shown in FIG. 8. In this embodiment, bolts 74 are welded to the underside of griddle plate 52. Bolts 74 are longer than bolts 68. A compression spring 76 is telescoped over each bolt 74, and is held in place by a nut 78 and an associated washer 80. The top of the compression spring bears against a clamp 82.

Clamp 82 comprises a plate 84 having an opening 86, through which bolt 74 passes. The plate includes upwardly extending lips 88. The lips, in turn, bear against the bottom of heater bars 54. The heater bars are thus held in place by the clamps 82, with the amount of pressure on the clamps being regulated by the rotation of nut 78, and the subsequent compression of spring 76.

Referring again to FIGS. 1 to 5, it is seen that a control box 90 is secured to outer bottom 48. The various components contained within the control box will be described hereinafter, with respect to the wiring diagram of FIG. 9. A conduit 92 connects control box 90 with junction box 94 (FIGS. 1 and 4). Electrical power for the device 10 is furnished through junction box 94. Junction box 94 is mounted on rear leg 90 of the frame 16.

Figure 2:
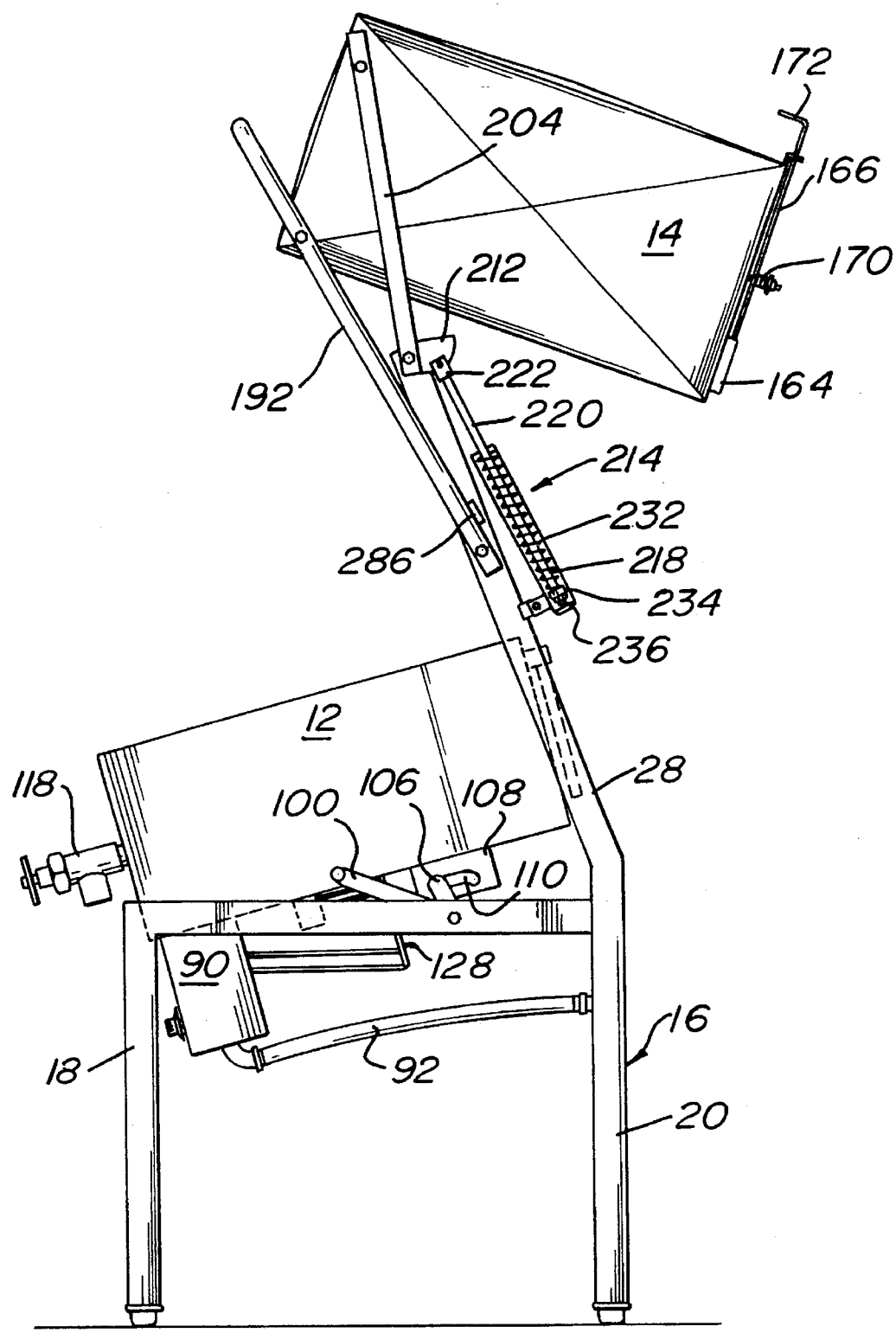
FIG. 2 is a side elevational view of the cooking device of this invention, shown in its fully open position.
Figure 3:
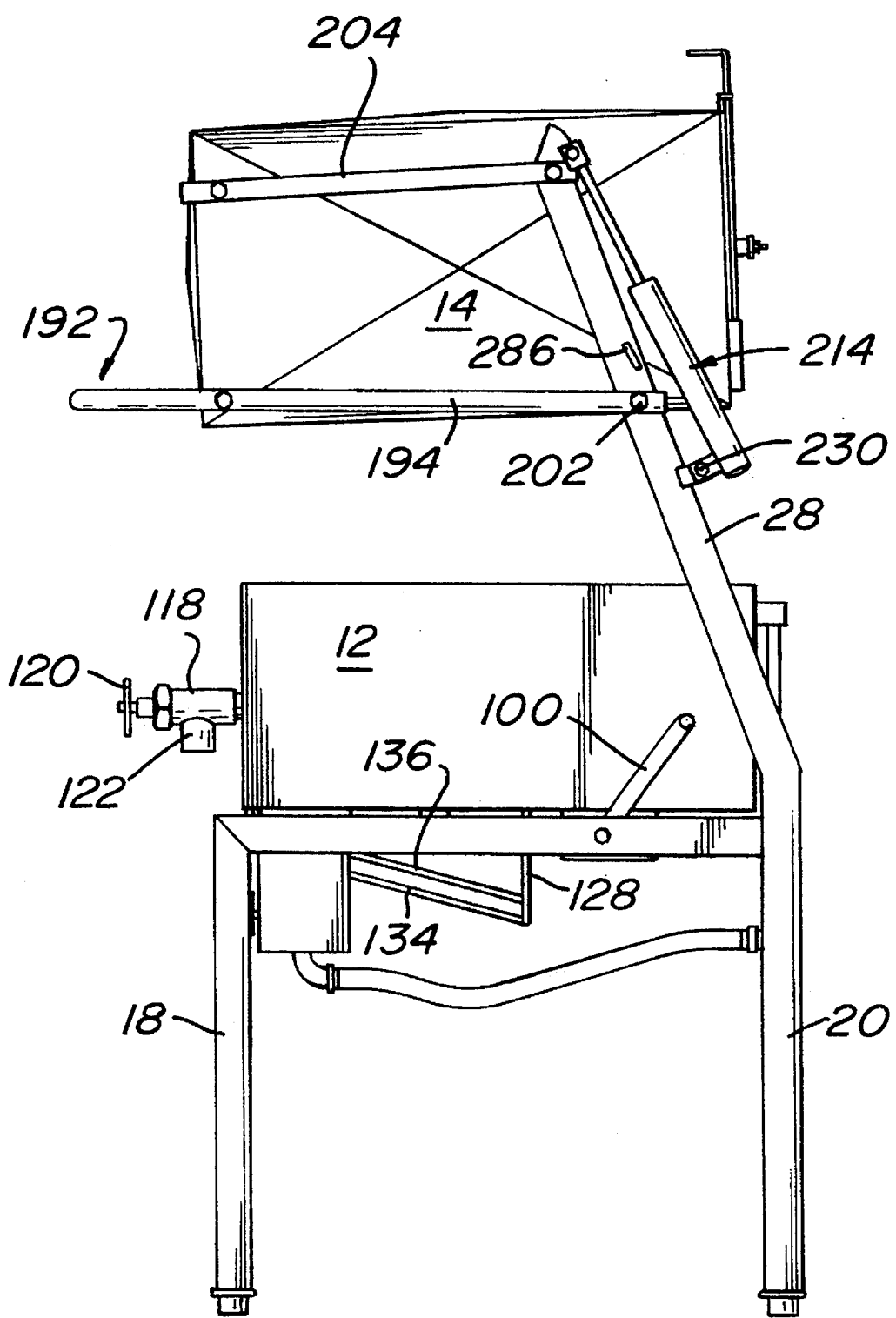
FIG. 3 is a side elevational view of the cooking device of this invention, shown in its partially open position.

As seen in FIGS. 1, 5 and 6, plates 96 are secured at the bottom of side walls 34 and 36. Shafts 98 pass through plates 96, and the shafts are secured in the legs 22. Base 12 is rotatable about the shafts 98, as seen in FIGS. 2 and 6.

Rotation is accomplished through the use of arm 100, which has a handle 102 projecting perpendicularly from the top thereof. As seen in FIG. 4, arm 100 is rotatably mounted on frame leg 22 by shaft 104. A plate 106 (FIGS. 2 and 6) is secured to arm 100, at a predetermined, fixed angle. A plate 108 (FIGS. 2 and 6) is secured to the underside of the outer bottom 48. As best seen in FIG. 6, plate 108 includes a cam slot 110, which has a forward horizontal portion and a downwardly extending rear portion.

A shaft 112 (FIG. 6) projects perpendicularly inward from plate 106, and passes through slot 110. The shaft has a sleeve rotatably mounted thereon, which is received within the slot. An enlarged nut 114 (FIG. 4) maintains the sleeve between the plate 106 and the nut, and within slot 110.

A pipe 116 (FIG. 5) passes through walls 30 and 40, and the interior of the pipe is in fluid communication with the interior of base 12. A valve 118 is secured on pipe 116. Valve 118 includes a rotatable handle 120 and an outlet pipe 122.

A rack 124 is mounted on bottom 48, adjacent outer front wall 30. The rack includes front vertical rods 126, rear vertical rods 128, an upper front rod 130 (FIG. 4), a lower front rod 132 (FIGS. 1 and 4), an upper rear rod (not shown), similar to upper front rod 130, and a lower rear rod 133 (FIG. 4). A pair of rods 134 (shown in section in FIG. 4 and shown in full in FIGS. 1 to 3, 5 and 6) extend downwardly from the front to the rear of the rack, and are positioned inwardly of vertical rods 126 and 128. A second pair of rods 136 are positioned inwardly of front vertical rods 126 and rear vertical rods 128, and are parallel to rods 134. Upper rods 138 (FIGS. 5 and 6) extend from the front to the rear of the rack, and are parallel to bottom 48. As seen in FIG. 4, the rods 138 are spaced inwardly from the vertical rods 126 and 128.

A pan 140 is supported by rack 124. When the base 12 is in the horizontal position shown in FIGS. 3 and 4, the lip of the pan rests on the upper rods 138, thereby maintaining the pan in a horizontal position. The pan is slidable in the rack, and can be moved from the position shown in full line at 140 in FIG. 5 to the position shown in phantom at 140' in FIG. 5. Additionally, the pan it totally removable from the rack.

When the base is in the tilted position shown in FIGS. 2 and 6, the pan rests on the lower rods 134. These rods are inclined downwardly when the base 12 is horizontal (FIG. 3), but are horizontal when the base 12 is tilted, as seen in FIGS. 2 and 6. Accordingly, when the pan rests on rods 134 when the base is in the tilted position, the pan will be horizontal. The purpose of the upper rods 136 is to prevent the inadvertent tipping of the pan 140 when it is in the extended position shown in FIG. 6. Thus, if it should be tipped downwardly, the rear of the pan would strike the rods 136, which will prevent any further tipping.

As seen in FIGS. 5 and 6, a block 142 is mounted on the interior surface of each side support 22. When the base 12 is in a horizontal position, its side walls rest on blocks 142.

Cover or lid 14 includes outer front wall 144, outer rear wall 146 and outer side walls 148. The lid further includes an inner front wall 150, an inner rear wall 152 and inner side walls 154. The lid further includes an outer top 156 and an inner top 158. Insulation 160 is placed between the inner and outer walls of the lid and the inner and outer top. The insulation is of the same type as that used in the base 12.

A conduit 162 (FIGS. 4 and 5) passes through rear walls 146 and 152 and the insulation between the walls. The conduit is in fluid communication with both the interior and exterior of lid 14. A cover 164 (FIG. 5) closes conduit 162.

A rectangular bar 166 (FIGS. 1 and 5) is pivotally mounted on a shaft 168 projecting from the rear wall 146 of lid 14. A spring 170 bears against the outer surface of bar 166, with the pressure of the spring preventing the free rotation of the bar around shaft 168. The top of bar 166 includes a flange 172.

As seen in FIG. 1, a plate 174 is secured on rear wall 146, and projects above the top 156. Plate 174 has the numbers 0, 25, 50, 75 and 100 engraved therein. Tabs 176 project rearwardly from the plate 174, to a position beyond bar 166 (see FIG. 5).

As will be explained in further detail hereinafter, device 10 can be used for steaming food. When steam is generated, the interior of the device will be filled with steam. If the steam pressure should become too great, the pressure can be relieved by having some of the steam pass through conduit 162. However, the conduit is normally closed by cover 164. When the cover overlies the conduit, in a full closing position, the bar 166 bears against the right tab 176, and will be aligned with the number 0 on plate 74 (see FIG. 4).

When the conduit 176 is to be opened half-way, with the cover 164 still closing the other half of the conduit, the bar 166 is rotated around shaft 168 until the bar is aligned with the number 50 on plate 174. The spring 170 will hold the bar, and its dependent cover 164, in place. When the conduit 162 is to be totally opened, the bar 166 is rotated until it is placed over the number 100. At this point, it will be bearing against the left tab 176. The amount of opening of the conduit 162 is indicated by the numbers on the plate 174.

As seen in FIGS. 4 and 5, lid 14 has an L-shaped notch 178 formed along its entire lower edge. The upper edge of base 12 is beveled downwardly, as best seen at 180 in FIG. 6. Beveled edge 180 has an apex 182. When the lid 14 is in a closed position with respect to base 12, the apex 182 is received in the apex of notch 178. Because the beveled edge 180 is inclined downwardly into the interior of the base 12, when steam is generated within device 10, any condensation on the mating surfaces between notch 178 and beveled edge 180 will drip back into the device. Additionally, any condensate dripping down the inner walls of lid 10 will drip past the beveled edge 180, because of the inclination of the beveled edge. Since the outer surface of notch 180 overlies outer wall 34 of base 12, should any unwanted materials, such as liquids or prepared foods, fall on the outer walls of lid 14, they will drip past the junction of the base and the lid, and be prevented from entering the base 12.

When the device 10 is used for preparing foods in pans 84 (FIG. 5), a rack 186 is provided. Rack 186 includes legs 188 which rest on griddle plate 52, and tracks 190 for receiving the lips of the food pans 184. When food is being prepared by grilling or frying, the rack 186 is lifted off base 12, and stored. As best seen in FIG. 1, lid 14 is raised relative to base 12 through the use of U-shaped handle 192. Handle 192 includes side legs 194 and bridging section 196. The handle 192 is pivotally secured to lid 14 through the use of shafts 198 that pass through the legs 194 and are secured in the lid 14. Spacer sleeves 200 are positioned over shafts 198. Handle 192 is pivotally secured to arms 28 of the supporting frame by shafts 202.

As best seen in FIG. 1, a guide arm 204 is rotatably mounted on each frame arm 28 by a shaft 206 (see also FIG. 4). Each guide arm 204 is pivotally linked to lid 14 by shafts 208 and associated spacer sleeves 210. A tab 212 is secured to each guide arm 204 and projects upwardly from the top thereof.

A spring piston 214 is pivotally linked to each tab 212 by a pin 216. Each piston 214 includes a cylinder 218 (FIG. 2) and a rod 220. Each rod 220 has a flattened end 222, through which the pin 216 passes. As seen in FIG. 4, a spacer sleeve 224 separates flattened end 222 from tab 212.

A bracket 226 is mounted on the outer side of each arm 28 of the frame. A tab 228 projects from each cylinder 218. The spring piston 214 is pivotally linked to bracket 226 by a pin 230 that passes through tab 228.

Referring to FIG. 2, it is seen that a compression spring 32 surrounds rod 220, within cylinder 218. The bottom of spring 32 bears against disk 234, which disk is held in place by nut 236, which is threadedly secured on the bottom of rod 220. Disk 234 is in frictional, sliding contact with the interior wall of cylinder 218. The disk can be formed from any material normally used in spring pistons, such as rubber.

All of the heat needed to operate the cooking device of this invention is provided through heater bars 54. These bars heat the griddle plate 52, which in turn can produce dry heat, steam heat or a heated frying surface for preparing food.

Electrical power for device 10 enters through junction box 94, and the device is controlled at control box 90.

Electric power for effecting the heating of the heater bank 54 is provided from a source of three phase AC power, either at 208 to 240 volts, at 380 to 415 volts or at 480 volts. Power can also be supplied from a source of single phase AC power, at 208 to 240 volts. The circuit for delivering the 380–415 volt power is shown in the upper left portion of FIG. 9, while the circuit for delivering the 480 volt power is shown in the upper right portion of FIG. 9. As can be seen therein electrical current at 380–415 volts is provided to the resistance heater bank 54 from a 380–415 volt three phase source (not shown) through the power circuit made up of three sets of closeable electrical contacts 264 disposed in series in respective ones of three power lines from the source and through an associated, serially connected distribution block 266 to the heater. The 380–415 volt power circuit is grounded at 268. In a similar manner, electrical current at 480 volts is provided to the resistance heater bank 54 from the associated three phase 480 volt source (not shown) through the power circuit made up of three sets of closeable electrical contacts 278 disposed in series in respective ones of three power lines from the source and through an associated, serially connected distribution block 280. The 480 volt power circuit is grounded at 282.

Figure 9:
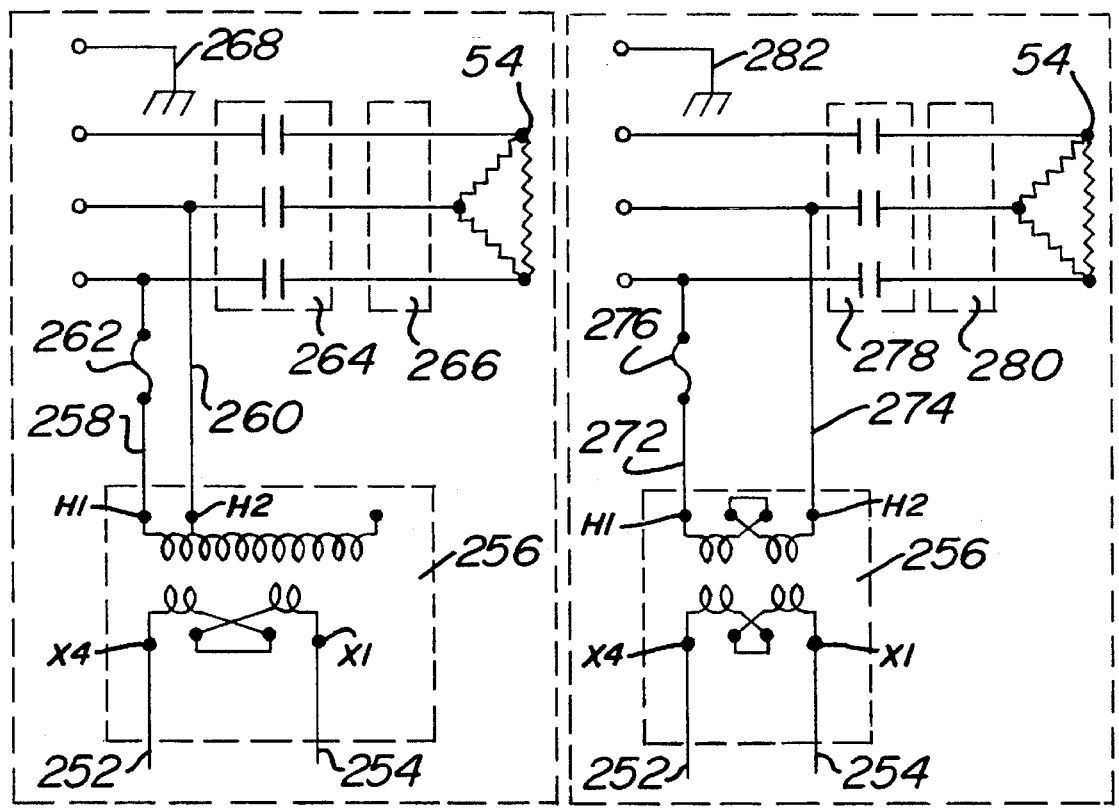
Figure 9:
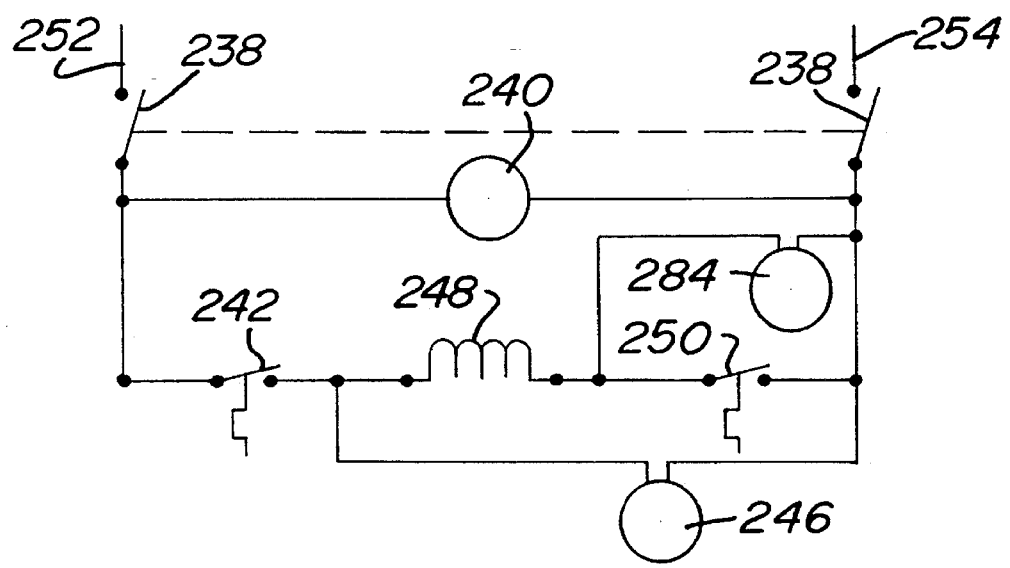

The closure of the contacts 264 in the 380–415 volt power circuit or the closure of the contacts 278 in the 480 volt power circuit to result in the heating of the heater bank 54 is controlled by a common control circuit shown in the bottom portion of the schematic diagram of FIG. 9. Electrical power for operating the common control circuit is provided from the power circuits themselves via their output lines 252 and 254. In this regard control power to the common control circuit is provided from the 380–415 volt, three phase, power circuit via a pair of input lines 258 and 260, while control power is provided from the 480 volt, three phase power circuit via a pair of input lines 272 and 274. A fuse 262 is connected in series in the input line 258, while a fuse 276 is connected in series in input line 272. The input lines 258 and 260 are connected to one portion of a primary coil of a transformer 256. The secondary of the transformer 256 is connected to the output lines 252 and 254. The input lines 272 and 274 are also connected to the primary coil of the transformer 256.

A dual throw, single pole rocker switch 238 is connected to the output lines 252 and 254, so that when the switch 238 is closed the control circuit is energized via those lines. A red lamp 240 is connected across the switch 238 to illuminate when the switch is closed to indicate that the device 10 is ready for operation.

The desired temperature for the heater bank 54 is established by an adjustable operating temperature thermostat 242 in the common control circuit. In particular, the thermostat 242 is connected in series with a contactor coil 248 and a high limit thermostat 250. The contactor coil 248 is coupled to the contacts 264 and 278 so that energization of the coil results in the closure of those contacts. The setting of the operating temperature of the thermostat 242 is achieved by a rotary control knob 244 (FIG. 1) coupled to the thermostat. A thermostat indicator lamp 246 is connected across the contactor coil 248 and the high temperature limit thermostat 250 so that the lamp 246 illuminates when the operating thermostat 242 is closed and power is applied to the common control circuit via switch 238. The high temperature limit thermostat 250 is provided to deenergize the heater bank 54 in the event that a predetermined high limit temperature is reached. An amber colored lamp 284 is connected across the high temperature thermostat to warn of its operation.

Operation of the circuitry of FIG. 9 is as follows: When the on/off switch 238 is closed this causes the lamp 240 to illuminate switch 238 and the operating temperature thermostat 242 to close, whereupon current flows through the contactor coil 248. At the same time the thermostat lamp 246 illuminates. The flow of current through the coil 248 causes the associated contacts 264 or 278 in the power circuits to close, whereupon power from one or the other of the power circuits is provided to the heater bank to cause the resistance heating elements thereof to begin to heat up. Should the heater bank 54 attempt to heat up the device 10 higher than the desired operating temperature, i.e., the temperature established by the operating thermostat 242, the operating thermostat 242 will open, whereupon the contactor coil 248 will be deenergized, thereby resulting in the automatic opening of the contacts 264 or 278 in the associated power circuit. The opening of these contacts results in the immediate deenergization of the heater bank 54.

In the event that the operating thermostat 242 should fail, i.e., remain closed, as a safety precaution the high temperature limit thermostat 250 will open when its set-point temperature is reached. At this time the amber lamp 284 will be illuminated to alert the operator to a possible malfunction.

When power is supplied at 208 to 240 volts, the circuitry is basically the same as that shown in FIG. 9. However, no transformers are necessary.

Device 10 is capable of numerous functions in preparing food. It can be used as a steamer, a skillet, a griddle, a fryer, a kettle, an oven and a holding cabinet. Changing from one mode of operation to another is easily accomplished.

In using the device, the first step is to lift handle 192 (FIG. 3) in order to raise lid 14. When the lid is initially lifted, in addition to moving vertically upward, it will also move forward, toward the food preparer. (See FIG. 3). Accordingly, any steam or hot air in the base 12 will exit rearward, rather than toward the food preparer, thereby protecting the food preparer from any burst of steam or heat. The lid 14 can be maintained at any height relative to base 12, or can be pivoted rearwardly, as shown in FIG. 2. The position of the lid relative to the base is maintained by the pivoting of handle 192 and guide arms 204 on arms 28. The geometry of the pivot points coupled with the weight of the lid, and the tension provided by spring pistons 214 permit the maintaining of the lid 14 at any position above base 12 to the full open position shown in FIG. 2. Stops 286 (FIGS. 1–4) prevent the rotation of lid 14 beyond the position shown in FIG. 2. Thus, as the lid is lifted, the handle 192 will eventually abut stops 286.

When the device 10 is to be used for steaming food, the lid 14 is raised to a sufficient height to permit the rack 186 (FIG. 5) to be placed on base 12. The desired number of pans 184 containing the food to be steamed are then slid onto the rack. Water 288 is then placed in base 12. The water is supplied by a hose, which is connected to any available source of water. If desired, a clamp can be placed on device 10 for supporting the hose on the device, thereby having a source of water readily available for producing steam or for use in cleaning the device. This avoids wasting time in transporting water to the device.

When the desired amount of water has been added, the lid 14 is lowered to the position shown in FIG. 5. This is easily accomplished by pulling the handle 192 down, against the reverse pull of the spring piston 214. When the lid is fully lowered, it remains in place, and cannot be inadvertently lifted by the spring.

Once the device is closed, switch 238 (FIGS. 1 and 9) is turned on. The desired temperature is set by control knob 244, and current is supplied to the resistance heaters 54. As the water 288 is heated, it will eventually turn to steam.

The steam that is produced will heat the food in the pans 184. Once the food is brought to the desired cooking temperature, that temperature will be maintained by the steam. During the initial stages of the cooking, the condensate from the steam will form on the inner walls of the device. The condensate on the upper inner walls will drip into base 12, due to the inclination of the notch 178 at the bottom of lid 14 and the beveled edge 180 at the top of base 12. The mating of the beveled edge 180 and the notch 178 prevents leakage, without the necessity of providing gaskets or other sealing devices.

Continued heating of the food in the pans by the steam will eventually cause the steam pressure to build up in device 10. With the buildup of pressure, steam can escape through the juncture of the notch and the beveled edge. In order to reduce the steam pressure, while still maintaining an elevated temperature within the device, cover 164 is moved relative to conduit 162, to permit some of the steam to escape. Movement of the cover is through the rotation of bar 166 around shaft 168. The amount of opening of the conduit 162 is indicated by the numbers on plate 174 (FIG. 1). The pressure of spring 170 holds the bar 166 in whatever position it is set. Through experimentation, the amount of opening and the time of opening of the conduit 162 can be determined for each type of food that is being prepared.

After the food has been fully heated, it is removed from device 10. In order to accomplish removal, the lid 14 is raised to a position which permits the ready withdrawal of food pans 184. Generally, this can be accomplished by having the lid in the position shown in FIG. 3. The food pans are withdrawn from the rack 186, and replaced by other food pans containing food that is to be heated.

One of the novel features of the device of this invention relates to the manner of removing food and replacing it with other food to be heated. In the prior art, where food was heated by a steaming device, in order to gain access to the food in order to check whether it is fully prepared or to remove it, and in order to place new food pans into the device, a front door had to be swung open. When this occurred, all of the steam within the steaming device escaped into the atmosphere, and the temperature within the device dropped significantly. In the device of this invention, when the lid 14 is lifted to the position shown in FIG. 3, the steam remains trapped in the lid. When the food pans with the prepared food are quickly removed and replaced by new food pans, and the lid is again lowered, it has been found that there is virtually no loss in temperature. The temperature within the device remains close to the operational temperature of the device, prior to the removal of the food and the placing of new food inside the device.

This feature of the invention was developed by the recognition that steam or hot air is lighter than room temperature air, and will rise. Accordingly, the steam will remain in the lid 14 when the lid is lifted. On the other hand, when the front door of the steaming devices or ovens of the prior art is open, the hot steam will immediately blast out of the device and rise into the atmosphere. This causes the rapid cooling of the interior of the prior art devices.

When the device 10 is used as a conventional oven, such as for roasting, no water is added to base 12. Instead, the heating of the griddle plate 52 will cause the temperature to rise within the interior of the device, and the device can be used in the same manner as a conventional oven.

The device can also be used as a holding oven, to keep foods that were previously heated warm. When operating as a holding oven, or as a conventional oven, if it is desired to raise the moisture content of the air within the oven, a small amount of water is added to base 12. As the device heats up, the water is vaporized, thereby raising the moisture level of the air within the device. However, there is not sufficient water to cause the generation of continuous steam. It has been found that many foods are prepared more quickly and have a more attractive appearance when they are prepared in moist heat, utilizing the device of this invention. Additionally, the moist heat is far superior to dry heat, when prepared food is kept heated in the device.

When it is desired to use the device as a kettle, such as in preparing soup or stews, the ingredients are placed in the base 12 and heated through heaters 54. The lid 14 can either be raised and lifted out of the way, as shown in FIG. 2, or it can rest on the base 12. The base 12 can be used as a deep-fat fryer, in the same way.

When the device is to be used as a griddle or skillet, the lid 14 is raised and pivoted out of the way, to the position shown in FIG. 2. The food can be grilled or fried by having the base in the horizontal position shown in FIG. 3 or in the inclined position of FIGS. 2 and 6. In order to incline the base, arm 100 is rotated in a counterclockwise direction, from the position shown in FIG. 3. This moves shaft 112, and its associated sleeve, in cam slot 110, thereby raising the rear of the base 12. When the shaft 112 is in the forward portion of the cam slot 110, as seen in FIG. 6, the weight of the base maintains the shaft in that position, and the angle of the base will be maintained.

The angle of inclination of the base 12 is predetermined by the size and shape of the cam slot 110. The optimum angle is that which will permit the rapid draining of grease as food is being fried or grilled, while at the same time, not being at such an incline as to cause the food to slide down the plate 54 toward inner wall 38 of base 12. The optimum angle is 10° from the horizontal, although, depending on the particular food being prepared, i.e., pancakes as opposed to chopped beef, the angle would vary slightly from 10°. Since the angle is preset, the angle is set at 10°, which is the optimum overall angle for all foods that could be prepared on the base 12.

In the prior art, it was possible to vary the angle of a griddle plate relative to the horizontal. This was accomplished through the use of a crank arm and gears. Although this mechanism provided an infinitely adjustable angle for a griddle plate, only through experimentation each time the griddle plate was raised could the optimum angle be determined. During the experimentation period, food could be ruined, such as when pancakes run or meat slides downwardly. Having the preset angle for the griddle plate ensures that the optimum angle is used each time the griddle plate is inclined.

When the griddle plate is used, the finished food product is placed in food pan 140. Thus, pancakes or bacon can be stacked in the food pan. When chopped meat is prepared, it is scooped and placed in the food pan. With the griddle at an angle, the food pan is horizontal, as shown in FIG. 6. Similarly, when the griddle plate is horizontal, such as when the base is used for frying or as a kettle, the food pan 140 is horizontal, by placing it in the upper tracks of the rack 124.

When the base 12 is used for deep frying, after the frying has been completed, the frying oil is removed from the base by opening valve 118 (FIG. 5). The frying oil, shown in phantom at 290 in FIG. 5, can then be collected in a food pan 140. Alternatively, a metal bucket can be suspended from valve 118, in order to collect the oil. Other liquids, such as the water used to generate the steam, can be withdrawn from the base in a similar manner.

When the base 12 is inclined, and the device is used for grilling or frying such products as chopped meat or bacon, the valve 118 is left open. This permits any fat or grease produced by the heating process to drip into a food pan 140 (FIG. 6) or a bucket suspended from valve 118. In this way, fat is constantly removed during the grilling or frying process, and this results in having less fat in the heated product.

The device of this invention can be made from any materials generally used for cooking devices. Stainless steel is a preferred material. As shown in FIGS. 7 and 8, the griddle plate 52 can be formed from another metal 56 which is clad with a stainless steel layer 58. The stainless steel layer provides durability, whereas the base metal provides better heat conductivity than stainless steel. A preferred base metal is carbon steel.

The handle 192 serves a safety function, in addition to its function of lifting lid 14. Thus, because the handle projects beyond the valve 118, it prevents the operator from inadvertently bumping into the valve when preparing food.

One of the novel features of this invention is the provision of spring pressure to hold heater bars 54 against the griddle plate 52. This pressure is provided by the leaf springs 60 (FIG. 7) or compression springs 76 (FIG. 8). Since the heater bars are not secured to the griddle plate, they are free to move relative to the griddle plate when they are heated. Since the heater bars have a different coefficient of thermal expansion from that of the griddle plate, there will be differential expansion. The high temperature grease coating between the underside of the griddle plate and the upper side of the heater bars facilitates this movement.

In the prior art, wherein heater bars were secured to the underside of a griddle plate, gapping occurred because of the difference in coefficients of thermal expansion of the griddle plate and the heater bars. This resulted in the loss of efficient heat transfer. This does not occur utilizing the assemblies shown in FIGS. 7 and 8.

Although the device has been shown and described as utilizing resistance heaters 54, it should be understood that it can be modified to provide gas burners as the source of heat. The burners would be positioned below the griddle plate 52, and would replace the heaters 54.

Without further elaboration, the foregoing will so fully illustrate this invention that others may, by applying current or future knowledge, readily adapt the same for use under various conditions of service.

I claim:

1. A cooking device having a hollow base and a hollow lid, with said base and said lid adapted to mate to provide an enclosed space, heating means associated with said base to heat the base, said base being adapted to be filled with water, with said water being heatable by said heating means in order to vaporize the water and create steam to fill said enclosed space, said lid having a lower edge, said lower edge having a notch formed therein, said base having an upper edge, with said upper edge adapted to be received within said notch, vent means in said lid to permit the passage of excess steam from said enclosed space to the atmosphere, means for lifting the lid relative to the base and means for maintaining the lid at a set position relative to the base.

2. The device of claim 1 wherein said notch is L-shaped and said upper edge is downwardly inclined toward the interior of said base, said notch having an apex and said upper edge having an apex with the apex of said upper edge being received in the apex of said notch.

3. The cooking device of claim 1 wherein said means for lifting the lid comprises a handle pivotally secured to said lid, said handle also being pivotally secured to a frame that supports said lid, whereby said lid can be lifted by pivoting said handle on said frame.

4. The cooking device of claim 1 wherein said means for maintaining the lid at a set position comprises spring means.

5. The cooking device of claim 1 wherein said vent means comprises a conduit connecting the interior of said lid with the atmosphere, a cover over said conduit and means for moving said cover to expose some or all of the outlet of said conduit to the atmosphere.

6. The cooking device of claim 1 wherein said base comprises a flat bottom and vertical walls extending upwardly therefrom, with said base being supported on a frame.

7. The cooking device of claim 6 wherein said base is pivotally mounted at its front on said frame, said cooking device further including means for raising the rear of the base relative to the frame, to cause said base to be positioned at a preset angle of inclination.

8. The cooking device of claim 7 wherein said frame includes means thereon for maintaining said base in a horizontal position, when the rear of the base is not raised to the preset angle of inclination.

9. The cooking device of claim 7 wherein said preset angle of inclination is 10°.

10. The cooking device of claim 1 wherein the bottom of said base comprises a plate, said heating means being secured on the underside of said plate, said heating means comprising electric resistance heater bars, said bars being held against the underside of said plate, and spring means for urging said heater bars against the underside of said plate.

11. The cooking device of claim 10 wherein said spring means comprise leaf springs.

12. The cooking device of claim 1, and further including conduit means in said base, said conduit means being adapted to permit the removal of any grease or excess water from said base after cooking has been completed.

13. The cooking device of claim 1 wherein the bottom of said base comprises a griddle plate, and said heating means being adapted to heat said griddle plate.

14. The cooking device of claim 13 wherein said lid is adapted to be maintained at a position wherein a cook has access to prepare foods on said griddle plate without contacting said lid.

15. The cooking device of claim 13 wherein the rear of said base can be raised relative to the front of said base, whereby the griddle plate will be inclined toward the cook, conduit means on said base to permit the draining of any grease from said base when food is being prepared on the griddle plate and valve means on said conduit means.

16. The cooking device of claim 13, and further including rack means on said base, said rack means being adapted to hold a food pan for placing food prepared on the griddle plate after the food has been prepared for consumption.

17. A cooking device having a hollow base and a hollow lid, with said base and said lid adapted to mate to provide an enclosed space, heating means associated with said base to heat the base, means for lifting the lid relative to the base, means for maintaining the lid at a set position relative to the base, said means for lifting the lid comprising a handle pivotally secured to said lid, said handle also being pivotally secured to a frame that supports said lid, whereby said lid can be lifted by pivoting said handle on said frame, a pair of arms pivotally secured to said lid, said arms also being pivotally secured to said frame, whereby said handle and said arms can maintain said lid in a horizontal position relative to said base when said lid is lifted.

18. The cooking device of claim 17 wherein said means or maintaining the lid at a set position comprises spring means.

19. The cooking device of claim 18 wherein said spring means are pivotally linked to said arms.

20. A cooking device having a hollow base and a hollow lid, with said base and said lid adapted to mate to provide an enclosed space, heating means associated with said base to heat the base, means for lifting the lid relative to the base, means for maintaining the lid at a set position relative to the base, said enclosed space being adapted to maintain steam therein, vent means in said lid to permit the passage of excess steam from said enclosed space to the atmosphere, said vent means comprising a conduit connecting the interior of said lid with the atmosphere, a cover over said conduit, means for moving said cover to expose some or all of the outlet of said conduit to the atmosphere, said moving means comprising bar means secured to said cover, said bar means being pivotable relative to said lid, and indicia associated with said bar means to indicate the amount of movement of said cover relative to said conduit.

21. A cooking device having a hollow base and a hollow lid, with said base and said lid adapted to mate to provide an enclosed space, heating means associated with said base to heat the base, means for lifting the lid relative to the base, means for maintaining the lid at a set position relative to the base, said base comprising a flat bottom and vertical walls extending upwardly therefrom, with said base being supported on a frame, said base being pivotally mounted at its front on said frame, said cooking device further including means for raising the rear of the base relative to the frame, to cause said base to be positioned at a preset angle of inclination, said means for raising said base comprising a handle pivotally mounted on said frame, said handle having a shaft projecting therefrom, and said shaft being received in a cam slot on said base, whereby the movement of said handle can raise the base to the preset angle of inclination or lower the base onto said frame.

22. A cooking device having a hollow base and a hollow lid, with said base and said lid adapted to mate to provide an enclosed space, heating means associated with said base to heat the base, means for lifting the lid relative to the base, means for maintaining the lid at a set position relative to the base, with the bottom of said base comprising a plate, said heating means being secured on the underside of said plate, said heating means comprising electric resistance heater bars, said bars being held against the underside of said plate, spring means for urging said heater bars against the underside of said plate, said spring means comprising compression springs, said compression springs bearing against clamps, which clamps hold said heater bars in place against said plate.

23. A cooking device having a hollow base and a hollow lid, with said base and said lid adapted to mate to provide an enclosed space, heating means associated with said base to heat the base, means for lifting the lid relative to the base, means for maintaining the lid at a set position relative to the base, with the bottom of said base comprising a griddle plate, said heating means being adapted to heat said griddle plate, rack means on said base, said rack means being adapted to hold a food pan for placing food prepared on the griddle plate after the food has been prepared for consumption, wherein the rear of said base may be raised, to have the griddle plate angled downwardly toward the cook utilizing the griddle plate, and said rack means having inclined means for holding the said food pan, with the angle of inclination of the inclined means being the same as the angle of inclination of the griddle plate, when the griddle plate is raised, but extending in the opposite direction, whereby a food pan placed on said inclined means can be maintained in a horizontal position when the rear of the base is raised.

24. A device for frying food comprising a griddle plate, a frame for supporting the griddle plate, said griddle plate having a front end and a rear end, said griddle plate being pivotally mounted on said frame at its front end, means for raising the rear end of said griddle plate, means limiting the amount of raising of said rear end, in order to have said griddle plate at a predetermined angle of inclination, said means for raising said griddle plate comprising a handle pivotally mounted on said frame, said handle having a shaft projecting therefrom, a cam plate associated with said griddle plate, said cam plate having a cam slot therein, and said shaft being received in said cam slot, whereby the movement of said handle can raise the base to the predetermined angle of inclination by the movement of the shaft within the cam slot.

25. A cooking device comprising a griddle plate and means for heating said griddle plate, said heating means being secured on the underside of said griddle plate, said heating means comprising electric resistance heater bars, said bars being held against the underside of said plate, and spring means for urging said heater bars against the underside of said plate, said spring means comprising compression springs, said compression springs bearing against clamps, which clamps hold said heater bars in place against said plate.

* * * * *